United States Patent [19]

Rauterkus et al.

[11] Patent Number: 5,270,412
[45] Date of Patent: * Dec. 14, 1993

[54] DISPERSION POLYMERS WHICH CONTAIN UREA GROUPS AND ARE BASED ON ETHYLENICALLY UNSATURATED MONOMERS, PROCESS FOR THEIR PREPARATION AND THEIR USE

[75] Inventors: Karl J. Rauterkus, Kelkheim; Hans-Ullrich Huth, Egelsbach; Karl-Hans Angelmayer, Eltsville, all of Fed. Rep. of Germany

[73] Assignee: Hoechst Aktiengesellschaft, Fed. Rep. of Germany

[ * ] Notice: The portion of the term of this patent subsequent to Sep. 3, 2008 has been disclaimed.

[21] Appl. No.: 888,809

[22] Filed: May 27, 1992

Related U.S. Application Data

[60] Continuation of Ser. No. 640,698, Jan. 14, 1991, abandoned, which is a division of Ser. No. 354,110, May 19, 1989, Pat. No. 5,045,616.

[30] Foreign Application Priority Data

May 21, 1988 [DE] Fed. Rep. of Germany ....... 3817469

[51] Int. Cl.$^5$ ............... C08F 226/06; C08F 226/02; C08F 220/10; C08F 210/02
[52] U.S. Cl. .................... 526/258; 526/302; 526/319; 526/328; 526/341; 526/343; 526/346; 526/348
[58] Field of Search ....................... 526/258

[56] References Cited

U.S. PATENT DOCUMENTS 5,045,616 9/1991 Rauterkus et al. ............ 526/258

Primary Examiner—Joseph L. Schofer
Assistant Examiner—Wu C. Cheng
Attorney, Agent, or Firm—Bierman and Muserlian

[57] ABSTRACT

Dispersion polymers based on ethylenically unsaturated monomers, the polymers containing at least 1% by weight of specific monomer units of ethylenically unsaturated urea derivatives (see formula I), process for their preparation particularly by free-radical initiated emulsion, suspension or bead polymerization or copolymerization and their use as coating compositions, preferably in the form of aqueous dispersions, particularly as corrosion inhibiting metal coating compounds, moreover as adhesives, molded plastics and as binders, thickeners and auxiliaries in industrial chemical compositions.

8 Claims, No Drawings

DISPERSION POLYMERS WHICH CONTAIN UREA GROUPS AND ARE BASED ON ETHYLENICALLY UNSATURATED MONOMERS, PROCESS FOR THEIR PREPARATION AND THEIR USE

PRIOR APPLICATION

This application is a continuation of U.S. patent application Ser. No. 640,698 filed Jan. 14, 1991, now abandoned which is a division of U.S. patent application Ser. No. 354,110 filed May 19, 1989 now U.S. Pat. No. 5,045,616.

The invention relates to dispersion polymers based on ethylenically unsaturated monomers, these polymers containing units of ethylenically unsaturated urea derivatives, to a process for their preparation particularly by free-radical initiated emulsion, suspension or bead polymerization or copolymerization, and to their use as coating compositions, preferably in the form of aqueous dispersions, particularly as corrosion inhibiting metal-coating compositions, adhesives, molded plastics and as binders and auxiliaries in industrial chemical compositions.

Polymers containing urea groups are already known and are usually produced by polyaddition from (poly)isocyanates and mono- or polyfunctional amino compounds with the formation of prepolymers and subsequent further crosslinking or by crosslinking of oligomeric compounds containing amino and isocyanate groups, whose amino or isocyanate groups are optionally masked. The products which result in this way with the formation of urea groups are polymers whose urea groups are known to be a component of the principal polymer chains. The polyaddition reactions are usually carried out in bulk or, preferably, in inert organic solvents. Polyaddition in inert solvents has among other advantages that of easier control of the reaction and simpler removal of the heat of reaction and moreover simplifies the subsequent formulation of the polymers into solvent-containing coating compositions, paints or adhesives. In contrast, use of this polyurea addition polymer in aqueous systems, for example as aqueous dispersions or as aqueous paints, is known to require expensive measures, in order for example to initially dissolve the polymer in an organic solvent in the required concentration, to convert the solution into an aqueous form or to disperse the solution in an aqueous medium and to stabilize it and subsequently to remove the organic solvent again from the aqueous system.

The urea groups which are present in the polymer chains of the polyurea polymers can exert strong interactions within the polymer chains, which is known to favor among other attributes their suitability for use as water resistant and chemical resistant coatings, binders, fibers and moldings. Here, the very good adhesion of polyurea polymers to a very wide variety of substrates due to the strong polar interactions with these substrates, particularly metals and in particular iron, should be emphasized, a good anti-corrosive effect among other effects additionally resulting with iron. Polyurea polymers are thus very suitable as paints, for example for vehicle bodies, where they can produce high gloss, hard and solvent resistant coatings.

Ethylenically unsaturated polymerizable compounds which even in monomer form contain urea groups in the molecule, have hitherto been known only in small number. Some of the known ethylenically unsaturated monomeric urea derivatives which have at least one free isocyanate group are used in their monomeric form or also in their form which has already been polymerized or copolymerized via their ethylenically unsaturated radical as latent crosslinking agents, i.e. blocked at the free isocyanate group, in curable paints and coating compositions, where they can produce curing of the binder at elevated temperatures by reaction with functional groups of the paint resin or coating resin.

Ethylenically unsaturated urea derivatives with (meth) allyl groups and their use as comonomers in emulsion polymerization have already been disclosed in European Patent 3870. Dispersions produced therefrom by emulsion copolymerization are said to be suitable as binders for the production of emulsion paints with improved wet adhesion. When used as comonomers however, these monomers exhibit the disadvantages known in allyl polymerization. Nothing is disclosed concerning a possible applicability of the polymers or copolymers for surface coatings or for the production of anti-corrosive coats on metals.

Moreover, a commercially available ethylenically unsaturated monomeric compound of the formula (1),

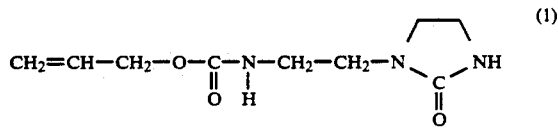

which contains a cyclic urea group is known, for example under the name WAM+)-IV-TM. It is used as comonomer in the production of conventional plastic dispersions by emulsion polymerization and is said to give the resulting copolymer dispersions an improved wet adhesion to alkyd resin substrates when the copolymer dispersions are used as binders in emulsion paints.
+) WAM=Wet Adhesion Monomer EP-OS 197, 635 discloses ethylenically unsaturated urea compounds with (meth)acrylate radicals whose urea group is substituted by a hydrogen atom at the nitrogen atom adjacent to the (meth)acrylate group and is substituted at the other nitrogen atom by a relatively large organic radical having at least 5 carbon atoms. These urea compounds do not exhibit significant solubilities either in water or in most organic solvents. They can be used, by copolymerization with $\alpha,\beta$-unsaturated carboxylic acids and other comonomers, for producing low viscosity thickener dispersions, which can be converted into high viscosity aqueous solutions by adjusting their pH to about 9. The products are said to have an improved resistance to hydrolysis and improved resistance to electrolytes, in comparison with other conventional thickeners, and can be used for improving the rheological properties of aqueous systems. No information is given about other applications of these products.

The emulsion polymers containing urea groups which have hitherto been disclosed have decisive disadvantages. Thus for example the abovementioned monomeric urea derivatives of the formula (1) can only be copolymerized to an inadequate extent due to their allyl double bond, so that their consequent low proportion in the copolymers can only exert a small influence on the properties of the copolymers. Accordingly, copolymers with monomer units of the formula (1) only have an advantageous effect on the wet adhesion of emulsion paints produced from them on alkyd resin substrates, but on the other hand have no anti-corrosion action on metals. Neither are the copolymers disclosed in EP-OS 197,635 with monomer units containing urea groups suitable for the surface coating of solid substrates, particularly not for the protection of metals from corrosion, since films of the dispersion copolymers described, possibly owing to their high proportion of carboxyl groups, are too water-sensitive.

The object of the present invention was thus to overcome the abovementioned disadvantages of the known copolymers containing urea groups, and in particular to provide polymers having urea groups which can preferably be produced by conventional emulsion polymerization and can subsequently be used advantageously and without additional heat treatment as coating compositions, particularly for the protection of metals from corrosion, further for the production of films, fibers, adhesives, paints, molding compounds, moldings, in some cases as thickeners in liquid media, as impregnation materials for porous substrates and as auxiliaries in the leather, textile, paper and building materials industries.

It has now surprisingly been found that the difficulties mentioned above can be overcome if a dispersion polymer produced by suspension or emulsion polymerization and based on ethylenically unsaturated monomers is used, the dispersion polymer containing at least 1% by weight of monomer units of ethylenically unsaturated urea derivatives of the formula I

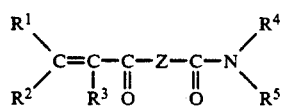

the radicals $R^1$ to $R^5$ and Z having the following meaning in formula I:

$R^1$, $R^2$, $R^3$, which may be identical or different, $=H$ or $CH_3$,

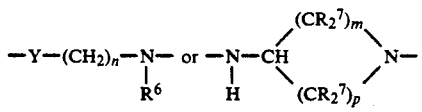

Y=oxygen or NH, n=2 to 4, preferably 2, $R^6$=an optionally substituted $(C_1-C_4)$-alkyl, $R^7$=H or $CH_3$ and m, p=in each case at least the number 1, preferably m+p=3 to 5, $R^4$, $R^5$, which may be identical or different, =H, an optionally substituted $(C_1-C_{30})$-alkyl, preferably a $(C_1-C_{18})$-alkyl, an optionally substituted $-(C_kH_{2-k})-OH$ with k=1 to 8, preferably 2 to 4, an optionally substituted $(C_6-C_{10})$-aryl, an optionally substituted $(C_7-C_{30})$-aralkyl, an optionally substituted $(C_5-C_8)$-cycloalkyl, an optionally substituted 5- to 7-membered heterocycle or an optionally substituted heterocycle formed from $R^4$ and $R^5$ jointly with the nitrogen atom.

In formula I the radical $R^4$ preferably stands for H when Z signifies the radical

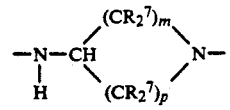

and $R^5$ signifies an optionally substituted 5- to 7-membered heterocycle, an optionally substituted $(C_5-C_8)$-cycloalkyl radical or an optionally substituted aryl radical.

Those monomeric urea derivatives are preferred according to the invention in which in formula I $R^1$, $R^2=H$ and $R^3=CH_3$, or $R^1$, $R^2=H$, $R^3=CH_3$ and

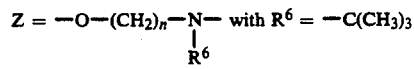

The polymerizable or copolymerizable ethylenically unsaturated urea derivatives of the abovementioned formula I which are used according to the invention as monomeric starting compounds are the subject of the U.S. patent application Ser. No. 354,129 filed May 16, 1989 filed on the same day and to which reference is hereby made.

Monomeric urea derivatives of the formula I which are particularly preferably used according to the invention for polymerization or copolymerization are those which have moderate to good solubilities in water and/or in organic solvents and/or in copolymerizable ethylenically unsaturated comonomers.

The invention therefore relates to dispersion polymers based on ethylenically unsaturated monomers, which contain monomer units of urea derivatives with $\alpha,\beta$-ethylenically unsaturated carboxyl radicals or carboxamide radicals and have preferably been produced by emulsion, suspension or bead polymerization or copolymerization or optionally by solution polymerization, or aqueous dispersions or optionally solutions of these dispersion polymers, wherein the dispersion polymers contain 1 to 100% by weight, preferably 1 to 30% by weight, particularly 5 to 20% by weight, of monomer units of ethylenically unsaturated urea derivatives of formula I, formula I having the abovementioned meaning.

The compounds of formula I can be produced in their monomeric form corresponding to the formula I in accordance with known methods by reaction of ethylenically unsaturated isocyanates with ammonia or amines, or by reaction of ethylenically unsaturated amines with isocyanates in bulk in the absence of water, it being possible, for improved reaction control, to carry out the reactions advantageously in inert organic solvents or also in so-called reactive diluents, i.e. copolymerizable ethylenically unsaturated monomers which behave inertly under the reaction conditions, such as for example vinyl esters, (meth)acrylates, vinyl aromatics and similar monomers with which the copolymerization is subsequently to be carried out.

The invention furthermore relates to a process for the preparation of the dispersion polymers or dispersion copolymers according to the invention by free-radical initiated solution, emulsion, suspension or bead polymerization of urea derivatives of the formula I or copolymerization of urea derivatives of the formula I with other known ethylenically unsaturated and copolymerizable monomers. Emulsion polymerization in the batch, preemulsion or metered addition process is particularly preferred. Water soluble urea derivatives of the formula I can be homopolymerized and/or copolymerized in aqueous solution, in the case of homopolymerization the polymer in some cases precipitating in the aqueous solution as an insoluble product and for example being able to be isolated in finely dispersed form by filtration. Urea derivatives of the formula I which are soluble in inert organic solvents can also be homopolymerized and/or copolymerized in organic solution, particularly in the case of homopolymerization the polymer in some cases precipitating in the organic solvent as insoluble product for example by filtration.

The polymerization and particularly the copolymerization is preferably carried out in an aqueous medium, it being possible to obtain in most cases stable aqueous dispersions, particularly copolymer dispersions. In the copolymerization of urea derivatives of formula I with other ethylenically unsaturated and copolymerizable comonomers, the copolymerization in aqueous medium, preferably emulsion polymerization, with formation of aqueous copolymer dispersions is particularly preferred. In particular, particularly stable aqueous plastic dispersions within the scope of the invention can be obtained by emulsion polymerization, it being possible for the plastic dispersions advantageously to be used for numerous fields of application.

The emulsion copolymers may preferably be obtained according to the invention as stable finely to coarsely dispersed aqueous latices with solids contents of preferably 10 to 70% by weight. The urea derivatives of the formula I may for example be added during the emulsion copolymerization, according to their solubility either in aqueous solution and/or in aqueous suspension and/or dissolved in the other comonomers and/or also suspended therein. The polymer dispersions or copolymer dispersions which can be obtained according to the invention and which may if necessary optionally be diluted with water or concentrated by removal of water in the normal way, after application of thin layers of the dispersion to solid substrates and subsequent drying, produce hard, glossy and weather-resistant films which adhere well to most substrates and which, despite the ammonia groups being located on molecular side chains in the macromolecules, exhibit a surprisingly good anti-corrosive effect for example on metal surfaces, particularly on iron and steel. The dispersion polymers or dispersion copolymers which can be obtained according to the invention may also for example be produced in dry powder form by removing the water component from the aqueous dispersions or optionally solutions, for example by spray-drying or by precipitation of the polymer component and filtration.

Copolymeric dispersion polymers according to the invention may contain, apart from monomer units of urea derivatives of the formula I, 0 to 99% by weight, preferably 70 to 99% by weight, particularly 80 to 95% by weight, of comonomer units, preferably those of the following copolymerizable monomers: vinyl esters of $(C_1-C_{18})$-carboxylic acids, particularly vinyl acetate, vinyl propionate, vinyl versatate, vinyl laurate, vinyl stearate; (meth)acrylates of $(C_1-C_{18})$-alcohols, particularly methyl methacrylate, butyl methacrylate, octyl methacrylate, ethyl acrylate, isobutyl acrylate, 2-ethylhexyl acrylate; vinyl aromatics with up to 18 carbon atoms, particularly styrene and vinyltoluene; vinyl chloride, ethylene, acrylonitrile, diesters of maleic acid and/or fumaric acid with $C_1-C_{18}$-alcohols, or else vinylpyrrolidone. Comonomer units may be contained both singly and in a plurality in the copolymer dispersion polymers. Comonomer units which are particularly preferred in the dispersion polymers are those which are resistant to hydrolysis in aqueous dispersions and can form stable copolymer products. The proportion of comonomer units in the copolymeric dispersion polymer depends, both as regards their type and also as regards their quantity, on the properties desired for the copolymeric final product on application, selection criteria known to those skilled in the art being used to determine and adjust the proportions.

When using dispersion polymers according to the invention in the form of aqueous dispersions their minimum film-forming temperature (MFT) should be below or in the region of the intended temperature of application, i.e., preferably between 0° and 80° C., particularly between 0° and 40° C. If dispersion polymers of a harder formulation are used, the required film-forming temperature can be achieved by co-using conventional film-forming auxiliaries or external plasticizers. If this is not desired, the MFT should particularly preferably be in the range between 0° and 25° C. The following monomer unit combinations are suitable for example in combination with monomer units of urea derivatives of the formula I, for example most particularly in the ratios by weight (pts=part by weight) given below, as component of copolymers dispersion polymers within the scope of the invention:

| Butyl acrylate/methyl methacrylate | 10–90 pts/90–10 pts |
|---|---|
| Butyl acrylate/styrene | 10–90 pts/90–10 pts |
| Octyl acrylate/methyl methacrylate | 5–80 pts/95–20 pts |
| Octyl acrylate/styrene | 5–80 pts/95–20 pts |
| Vinyl acetate/butyl acrylate | 40–80 pts/60–20 pts |
| Vinyl acetate/vinyl versatate | 50–80 pts/50–20 pts |

Regarding the general properties of the dispersion polymers which are to be used according to the invention, it can be advantageous in some cases if the dispersion polymers, in addition to the comonomer units already mentioned, contain further comonomer units of copolymerizable ethylenically unsaturated monomers having functional radicals, preferably radicals from the group —OH, —SO$_3$H or their salts, —N(R$^8$)$_2$, —N(R$^9$)$_3$, —COOH or their salts, —CON(R$^{10}$)$_2$ or epoxide. Here, preferably, R$^8$=(C$_1$-C$_6$)-alkyl or H, R$^9$=(C$_1$-C$_{18}$)-alkyl, (C$_7$-C$_{22}$)-aralkyl, glycidyl, H, (C$_1$-C$_4$)-hydroxyalkyl, (C$_1$-C$_6$)-carboxyalkyl and R$^{10}$=(C$_1$-C$_6$)-alkyl, H, hydroxymethyl, (C$_1$-C$_4$)-alkoxy, (C$_2$-C$_6$)-alkylsulfonic acid or their salts. Comonomer units of this type may be contained in the dispersion polymers preferably in quantities of 0 to 60% by weight, preferably 0.1 to 40% by weight, particularly preferably 0.3 to 5% by weight, based on the dispersion polymer, and preferably comprise units of for example the following monomers: acrylate, polyhydroxypropyl (meth)acrylate, glycidyl methacrylate, (meth)acrylic acid, maleic acid, fumaric acid, itaconic acid and the partial esters of the latter three, dimethylaminoneopentyl (meth)acrylate, dimethylaminopropyl (meth)acrylamide, dimethylaminoethyl (meth)acrylate, 2-N-morpholinoethyl (meth)acrylate, tert.-butylaminoethyl (meth)acrylate, (meth)acrylamide, N-hydroxymethyl (meth)acrylamide, trimethyl(ethylacrylate)ammonium chloride, benzyldimethyl(ethyl methacrylate)ammonium chloride, trimethyl(neopentyl acrylate)ammonium methylsulfate, acrylamidopropyltrimethylammonium chloride, diallyldimethylammonium chloride. Further, vinylsulfonic acid, 1-propyl-3-sulfonyl (meth)-acrylate, acrylamidomethylpropanesulfonic acid, acrylamidomethylpropanephosphonic acid and/or salts of these.

In the case of aqueous dispersions of dispersion polymers according to the invention which contain monomer units having functional groups, it may be advantageous and is generally usual during emulsion polymerization, to use surface active compounds (emulsifiers) and/or protective colloids to stabilize the dispersions. The concentration of auxiliaries of this kind can in the case of emulsifiers preferably be 0 to 20% by weight, particularly 0.1 to 7% by weight, and in the case of protective colloids preferably 0 to 5% by weight, particularly 0.1 to 2% by weight, based in each case on the dispersion polymer.

As emulsifiers, conventional nonionic surfactants are used, preferably for example from the group of surface-active reaction products of aliphatic, cycloaliphatic, araliphatic, aliphatic-aromatic, aromatic carboxylic acids, alcohols, phenols and amines with epoxides, such as for example ethylene oxide, and block copolymers of different epoxides, such as for example ethylene oxide and propylene oxide. Moreover, conventional anionic surfactants can be used, preferably for example surface-active ammonium salts and alkali metal salts of fatty acids (soaps), fatty alcohol sulfates, ethers of fatty alcohols with isethionic acid, alkanesulfonates, alkylbenzenesulfonates, (oxethylated) esters of sulfosuccinic acid, polyoxethylated fatty alcohol sulfates, alkylphenol polyoxethylate sulfates or (alkyl)-naphthol polyoxethylate sulfates and fatty alcohol phosphates. Other suitable emulsifiers are for example also surface-active primary, secondary and tertiary fatty amines in combination with organic or inorganic acids and additionally surface-active quaternary alkylammonium compounds. Moreover, in some cases known amphoteric surfactants with zwitterion structure, for example of the betaine type, such as for example alkylamidopropylbetaine, can be advantageous. The emulsifiers mentioned can be used both singly and, as long as they are jointly compatible, in combination mutually or jointly in the conventional manner.

Conventional protective colloids may be optionally co-used in the dispersions and indeed preferably those based on high molecular, organic compounds having HO—, $(R)_2N$—, $(R)_3{}^+N$—, HOOC— or ROOC-groups, R for example preferably being able to be an aliphatic radical with 1 to 8 carbon atoms, the organic compounds being water-soluble or dispersable in water, but displaying essentially no surface activity or no pronounced surface activity and having a pronounced dispersing power. Preferred protective colloids are those of non-ionogenic or cationic structure, such as for example cellulose ethers, polyvinyl alcohols, polysaccharides, polyvinylpyrrolidones, these compounds preferably being capable of substitution by amino groups, quaternary ammonium groups, carboxyl groups or carboxylate groups and carboxyalkyl groups (ester groups). Quaternary ammonium groups can for example be introduced into the underlying macromolecules by substitution using cationizing reagents, such as for example glycidyltrimethylammonium chloride. Cationic polyvinyl alcohols can for example also be obtained by hydrolysis of the corresponding vinyl acetate copolymers containing amino groups and/or ammonium groups. The quantities of protective colloid to be used depend on the desired dispersion properties, particularly on the fine particle character of the dispersion particles. Relatively large quantities of protective colloid are generally detrimental to the fine particle character of the dispersions.

In order to initiate polymerization or copolymerization in the production of dispersion polymers according to the invention, all those, preferably water-soluble, free-radical chain initiating systems customary for example in emulsion polymerization, such as azo compounds (azobisisobutyronitrile), peroxides (for example benzoyl peroxide, peresters (tert.-butyl peracetate) or percarbonates (dicyclohexyl peroxydicarbonate), which may also have an anionic character, can be used. Preferred free-radical initiators are water-soluble compounds such as for example 2,2'-azobis(2-amidionpropane) dihydrochloride, 2,2'-azobis(N,N'-dimethyleneisobutyramidine) dihydrochloride, 4,4'-azobis(4-cyanovaleric acid), $H_2O_2$, tert.-butyl hydroperoxide, persulfates such as ammonium persulfate, sodium, persulfate, potassium persulfate, redox systems such as $H_2O_2$ and ascorbic acid, peroxides and polyvalent metal salts, tert.-butyl hydroperoxide and Rongalite, where redox systems may be advantageous, in particular for reducing the residual monomer content in the post-reaction phase of the polymerization, additionally high energy radiation and conventional photo-initiators.

In order to control molecular weight particularly in emulsion, suspension, or bead polymerization, conventional regulators such as for example mercaptans or halogenated hydrocarbons can also be used to reduce the molecular weight, or else, optionally up to 5% by weight, based on the total quantity of monomers, of ethylenically polyunsaturated or multifunctional compounds also having the capability of crosslinking, such as for example divinylbenzene, ethylene glycol dimethacrylate, ethylene glycol diacrylate, butanediol dimethacrylate, butanediol diacrylate, triallyl cyanurate, melamine, isocyanatoethyl methacrylate, can be used for increasing the molecular weight.

The preparation of dispersion polymers according to the invention can be carried out preferably by known processes of free-radical initiated emulsion polymerization (batch process, preemulsion process or metered addition process), optionally under pressure and optionally with co-use of emulsifiers, protective colloids, dispersing agents, molecular weight regulators and pH regulators, it being possible in particular to obtain aqueous dispersions with contents of dispersion polymer solid of preferably 10 to 70% by weight, particularly 20 to 55% by weight, based on the dispersion. The adjustment to lower or higher solids contents in the dispersions is also possible by conventional methods. The pH of the aqueous dispersions is normally in the range of 3–9, preferably 3.5 to 8.5. The isolation of the dispersion polymers from the dispersions, preferably in powder form, is also possible by conventional methods, preferably for example by spray-drying or by mixing the dispersion with liquid precipitating agents by conventional methods.

Suitable solvents for dry dispersion polymers according to the invention are optionally for example aliphatic and preferably aromatic hydrocarbons, halogenated hydrocarbons, higher alkanols, ethers with higher alkyl radicals and cyclic ethers such as tetrahydrofuran and dioxane, and additionally ketones and esters.

It is also possible in principle to produce polymers of the type of the dispersion polymers according to the invention for example by free-radical initiated solution polymerization for example in water or in organic solvents and in the case for example of production in organic solvents to emulsify the resulting organic polymer solutions in water with the addition of emulsifier, to subsequently distill off the organic solvent and thereby to obtain aqueous polymer dispersions. This route however is expensive and possibly damaging to the environment in contrast to the preferred emulsion, suspension or bead polymerization in aqueous medium.

In the emulsion polymerization for the preparation of dispersion polymers according to the invention, the process is normally and preferably carried out in such a way that some of the monomeric urea derivative or derivatives of the formula I to be used is/are placed in the aqueous phase alone or as a mixture with other known and copolymerizable monomers, the polymerization is started by free-radical initiation and the remaining monomer or mixture of monomers is metered into the polymerization vessel with stirring and while maintaining the required polymerization temperature in the range of 20° to 100° C., preferably 50° to 90° C., optionally in dissolved preemulsified form, over 1 to 8 hours. In some cases it can also be advantageous if the total quantity of monomers and the aqueous phase are placed in the polymerization reactor and the polymerization reaction is carried out in the form of a batch.

The dispersion polymers according to the invention can be used both in bulk and in the form of their aqueous dispersions or aqueous solutions or dissolved in organic solvents for a range of different fields of application in a very advantageous manner. Preferably, the products are usable according to the invention as coating compound for solid substrates, particularly as anti-corrosive coating compound for metals, preferably for iron and steel, as starting material for the production of films, foils, fibers, adhesives, paints, molding compounds and moldings, as thickener in liquid aqueous or optionally nonaqueous compositions and as impregnating agent for porous substrates, additionally also as auxiliaries for the bonding of leather, textiles, paper, as binder in the production of fibrous synthetic leather, paper production, paper finishing and textile impregnation and also in the construction industry as binders in the production of concrete, mortar, plaster and paints.

The invention is described in more detail by means of the following examples.

EXAMPLE 1

240.5 g of demineralized water and 3.75 g of a 50% strength aqueous solution of sodium nonylphenol polyglycol ether sulfate (emulsifier) are placed in a 2 liter three-necked flask with stirrer, dropping funnel and reflux condenser. An emulsion is produced from 240 g of demineralized water, 7.5 g of 50% strength aqueous sodium nonylphenyl polyglycol ether sulfate solution, 193 g of methyl methacrylate, 182 g of butyl acrylate, 75 g of methacrylic acid, 3.75 g of acrylic acid, 37.5 g of N-methyl-N'-2-methacryloxy)-ethyl urea and 1.7 g of ammonium persulfate (APS). 15 g of this monomer emulsion are added to the aqueous emulsifier solution already in the flask and the flask is heated with stirring to 80° C. The polymerization is started by adding 0.175 g of APS to the flask at 80° C. and the remaining monomer emulsion is metered in with stirring at 82° to 84° C. over 3.5 hours. After a post-reaction phase of 2.5 hours, the reaction mixture is cooled to room temperature (RT). One hour after the end of the metering of the monomer emulsion, 7.5 ml of 17% strength by weight aqueous ammonia is added to the reaction mixture and, after cooling to RT has been carried out, more 17% strength by weight aqueous ammonia is added in order to adjust the resulting dispersion to a pH of 8.5. A dispersion is obtained with a solids content of 43.9% by weight.

COMPARATIVE EXAMPLE 1

A dispersion is produced in accordance with Example 1 with the difference that the monomer component N-methyl-N'-(2-methacryloyl)ethyl urea (37.5 g) is left out of the recipe of Example 1. The dispersion obtained on polymerization and adjusted to a pH of 8.5 has a solids content of 43.9% by weight.

EXAMPLE 2

Application tests

The dispersion polymers were tested in the form of an aqueous dispersion as a clear varnish. For this purpose the dispersions of Example 1 and of Comparative Example 1 were in each case spread as such with a 75 μm doctor blade onto the surfaces on both sides of degreased, phosphatized (=pickled) steel sheets and after completion of film formation are given a second drying in air for 14 days at room temperature, resulting in each case in a firmly adhering film of clear varnish about 35 μm in thickness on the steel test sheets. The test sheets coated in this way were subsequently subjected to a water immersion test in distilled water at room temperature, in order to test the anti-corrosive effect of the dispersion polymer films on the steel sheet. The result is reproduced in summary form in Table 1 and shows the experimentally determined corrosion behavior of the coated steel test specimens and the surprisingly good anti-corrosive effect of the clear varnish made from the dispersion polymer of Example 1 according to the invention, in comparison with the result with the clear varnish from the dispersion polymer of Comparative Example 1, whose macromolecules do not contain monomer units having urea groups.

TABLE 1

| Immersion period (hours) in dist. H₂O at 20° C. | Corrosion rating numbers of 0 to 5 (0 = no corrosion, 5 = very severe corrosion) | | |
|---|---|---|---|
| | | Corrosion rating numbers on steel test sheets with films of clear varnish from: | |
| | NCB = number of corrosion bubbles SCB = size of corrosion bubbles | Example 1 | Comparative Example 1 |
| 24 | NCB | 0 | 3 |
| | SCB | 0 | 0.5 |
| 48 | NCB | 0 | 4 |
| | SCB | 0 | 2 |
| 72 | NCB | 0 | 5 |
| | SCB | 0 | 3 |
| 500 | NCB | 0.5 | water immersion test discontinued, since the surface of the steel test specimens was severely destroyed by rust |
| | SCB | 0.5 | |

Corrosion behavior in distilled water at 20° C. of steel test sheets coated (to a thickness of about 35 μm) on both sides with films of clear varnish.

According to the result of the experiment with the film of clear varnish from Comparative Example, 1, the surface of the steel test specimen was already severely destroyed by rust after 72 hours exposure to water, while in the case of the test specimens coated with clear varnish of Example 1 according to the invention, the surface of the steel test specimens showed only slight corrosion phenomena even after 500 hours exposure to water.

We claim:

1. A polymer based on ethylenically unsaturated monomers containing monomer units of urea derivatives with $\alpha,\beta$-ethylenically unsaturated carboxyl or carboxamide groups produced by solution, emulsion, suspension or bead polymerization or copolymerization wherein the polymer contains at least 1% by weight of monomer of ethylenically unsaturated urea derivatives of the formula

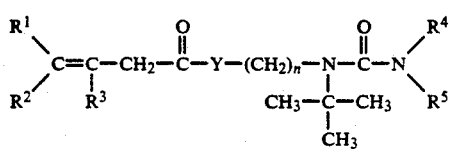

wherein $R^1$, $R^2$ and $R^3$ are individually hydrogen or methyl, Y is —O— or —NH—, n is 2 to 4, $R^4$ and $R^5$ are individually selected from the group consisting of hydrogen, alkyl of 1 to 30 carbon atoms aryl of 6 to 10 carbon atoms, aralkyl of 7 to 30 carbon atoms, cycloalkyl of 5 to 8 carbon atoms and a 5- to 7-membered heterocycle or taken together with the nitrogen to which they are attached form a 5- to 7-membered heterocycle.

2. A polymer of claim 1 wherein the compound of formula I is

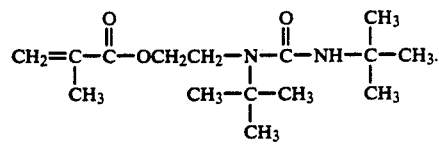

3. A dispersion polymer as claimed in claim 1, wherein it contains 1 to 100% by weight of monomer units of compounds of the formula I.

4. A dispersion polymer as claimed in claim 1, where apart from monomer units of the formula I it contains up to 99% by weight of comonomer units from the group of conventionally copolymerizable vinyl esters, methacrylates, acrylates, vinyl aromatics, acrylonitrile, ethylene or vinyl chloride.

5. A dispersion polymer as claimed in claim 1, wherein it contains comonomer units of copolymerizable ethylenically unsaturated monomers having functional radicals from the group —OH, —SO$_3$H or their salts, —N(R$^8$)$_2$, —N(R$^9$)$_3$, —COOH or their salts, —CON(R$^{10}$)$_2$ or epoxide, where $R^8$=(C$_1$-C$_6$)-alkyl or H, $R^9$—(C$_1$-C$_{18}$)-alkyl, (C$_7$—C$_{22}$)-aralkyl, glycidyl, H, (C$_1$-C$_4$)-hydroxyalkyl, (C$_1$-C$_6$)-carboxyalkyl and $R^{10}$=(C$_1$-C$_6$)-alkyl, H, hydroxymethyl, (C$_1$-C$_4$)-alkoxy, (C$_2$-C$_6$)-alkylsulfonic acid or their salts.

6. A dispersion polymer as claimed in claim 1, wherein it is present in the form of an aqueous dispersion whose minimum film-forming temperature (MFT) is in the range of 0° to 80° C.

7. A dispersion polymer as claimed in claim 1, wherein the monomer units of the formula I in their monomeric form have moderate to good solubilities in water and/or in organic solvents and/or in copolymerizable ethylenically unsaturated comonomers.

8. A dispersion polymer as claimed in claim 1, wherein it is present as an aqueous dispersion with a solids content of 10 to 70% by weight.

* * * * *

UNITED STATES PATENT AND TRADEMARK OFFICE
CERTIFICATE OF CORRECTION

PATENT NO. : 5,270,412
DATED : December 14, 1993
INVENTOR(S) : RAUTERKUS, et al It is certified that error appears in the above-identified patent and that said Letters Patent is hereby corrected as shown below:

Column 11, line 20
claim 1   change the formula to read as follows:

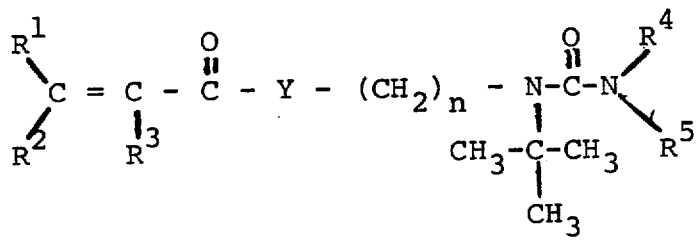

Signed and Sealed this

Second Day of May, 1995

BRUCE LEHMAN

*Attest:*

*Attesting Officer*            *Commissioner of Patents and Trademarks*